(12) United States Patent
Feinberg et al.

(10) Patent No.: US 9,296,605 B2
(45) Date of Patent: Mar. 29, 2016

(54) SYSTEM FOR AIDING HORSEBACK RIDERS IN MAINTAINING BALANCE

(76) Inventors: Robert Feinberg, Santa Barbara, CA (US); Brigitte Huber, Santa Barbara, CA (US)

( * ) Notice: Subject to any disclaimer, the term of this patent is extended or adjusted under 35 U.S.C. 154(b) by 0 days.

(21) Appl. No.: 14/237,317

(22) PCT Filed: Aug. 6, 2012

(86) PCT No.: PCT/US2012/049804
§ 371 (c)(1),
(2), (4) Date: May 28, 2014

(87) PCT Pub. No.: WO2013/022862
PCT Pub. Date: Feb. 14, 2013

(65) Prior Publication Data
US 2014/0253337 A1    Sep. 11, 2014

Related U.S. Application Data

(60) Provisional application No. 61/515,756, filed on Aug. 5, 2011.

(51) Int. Cl.
| | |
|---|---|
| G08B 23/00 | (2006.01) |
| B68C 1/12 | (2006.01) |
| A63K 3/00 | (2006.01) |
| G01L 1/18 | (2006.01) |
| G08B 7/06 | (2006.01) |
| B68B 1/12 | (2006.01) |
| B68C 1/06 | (2006.01) |

(52) U.S. Cl.
CPC . *B68C 1/126* (2013.01); *A63K 3/00* (2013.01); *G01L 1/18* (2013.01); *G08B 7/06* (2013.01)

(58) Field of Classification Search
USPC .................. 340/573.7; 54/66, 44.6
See application file for complete search history.

(56) References Cited

U.S. PATENT DOCUMENTS

| 5,357,696 A * | 10/1994 | Gray | A63B 7/00 |
| | | | 36/136 |
| 5,375,397 A * | 12/1994 | Ferrand | A61B 5/1036 |
| | | | 54/66 |
| 2003/0221328 A1* | 12/2003 | Ferrand | G01B 5/207 |
| | | | 33/561.1 |
| 2007/0051077 A1* | 3/2007 | Fennelly | B68C 1/12 |
| | | | 54/66 |

FOREIGN PATENT DOCUMENTS

DE    102009045829 A1    4/2011

* cited by examiner

*Primary Examiner* — Jack K Wang
(74) *Attorney, Agent, or Firm* — Avyno Law P.C.

(57) ABSTRACT

System is provided for aiding a horseback rider in maintaining balance while riding, includes sensor pad positioned between rider and saddle, pad/blanket worn by the horse during riding. Sensor pad includes sensors for measuring force exerted by the rider on the horse at individual measuring points. Controller configured for receiving force data from the sensor pad, includes a microprocessor continuously polling each sensor in the sensor pad for force data, calibrating each measurement based on an initial value, aggregating measurements from sensors on a left side and a right side of the sensor pad over a predetermined time interval, and calculating the differences between measurements on the right side and left side of the sensor pad. Power supply, electronic circuitry and alert mechanism receive signal from controller and notify rider when rider is off-balance based on calculated differences between measurements on right side and left side of sensor pad.

11 Claims, 6 Drawing Sheets

SYSTEM FOR AIDING HORSEBACK RIDERS IN MAINTAINING BALANCE

FIELD OF THE INVENTION

The present invention relates generally to systems, devices and related methods for aiding horseback riders in maintaining balance and correct positioning while riding horses.

BACKGROUND

A skillful horseback rider is always in balance with the horse, maintains a correct position in every gait and movement and possesses a commanding, but relaxed, presence, able to direct the horse with nearly invisible aids. The rider's mounted position greatly affects the rider's performance and ability to control the horse and ride correctly.

A need exists for a sensing device that is able to determine whether a rider is maintaining balance while riding a horse and that is able to notify the rider when he or she is out of balance and needs correction.

SUMMARY OF THE INVENTION

A system is provided for aiding a horseback rider in maintaining balance while riding. The system includes a sensor pad configured for positioning between a rider and a saddle. The sensor pad includes a plurality of sensors for measuring force exerted by the rider on the saddle at a plurality of individual measuring points. The system further includes a controller in communication with the sensor pad where the controller is configured for receiving force data from the sensor pad. The controller includes a microprocessor configured for continuously polling each sensor in the sensor pad for force data, calibrating each measurement based on an initial value, aggregating measurements from sensors on a left side and a right side of the sensor pad over a predetermined time interval, and calculating the differences between measurements on the right side and left side of the sensor pad. The system further includes a power supply, appropriate electronic circuitry and at least one alerting mechanism in communication with the controller, the alerting mechanism is configured to receive a signal from the controller and notify the rider when the rider is off-balance based on the calculated differences between measurements on the right side and left side of the sensor pad.

The alerting mechanism of the system may include either alternatively or in combination, a visual and/or audible indicator to communicate when the rider is off balance, or a tactile response, such as a vibrating mechanism. Further, in an alternative implementation, the controller may be designed to adjust measurements based on environmental factors, such as the riders experience level or wind or other conditions that could affect a rider's stability, balance or pressure exerted at a given time.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DESCRIPTION OF THE FIGURES

The description of implementations below is presented for purposes of illustration. It is not exhaustive and does not limit the claimed invention to the precise forms disclosed. Modifications and variations are possible in light of the description below, or may be acquired from practicing the invention. The claims and their equivalents define the scope of the invention.

DETAILED DESCRIPTION OF THE INVENTION

Figure 1:
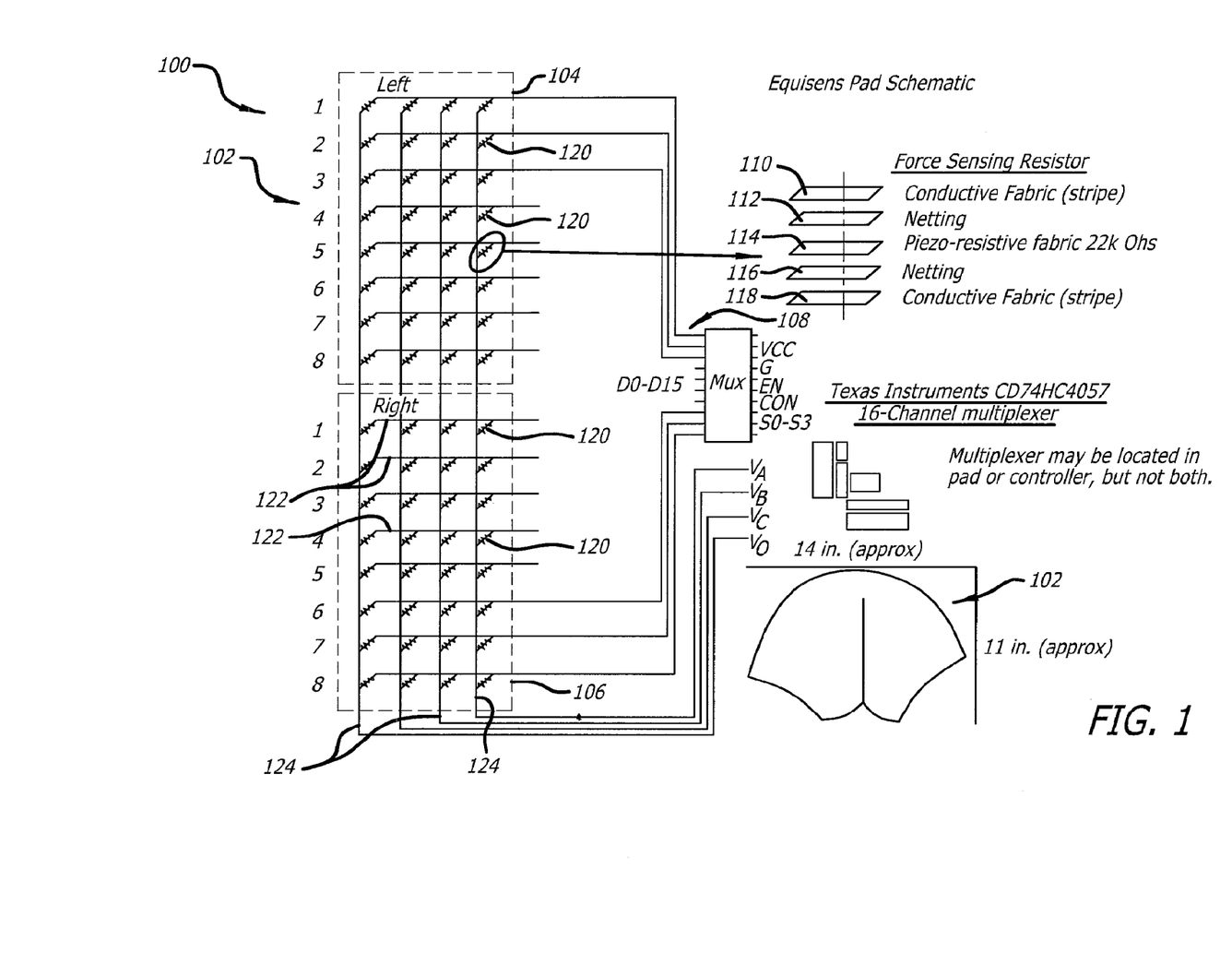
FIG. 1 is a schematic of one example of an implementation of the construction of a sensor pad that may be utilized in conjunction with the training system of the present invention.
Figure 2:
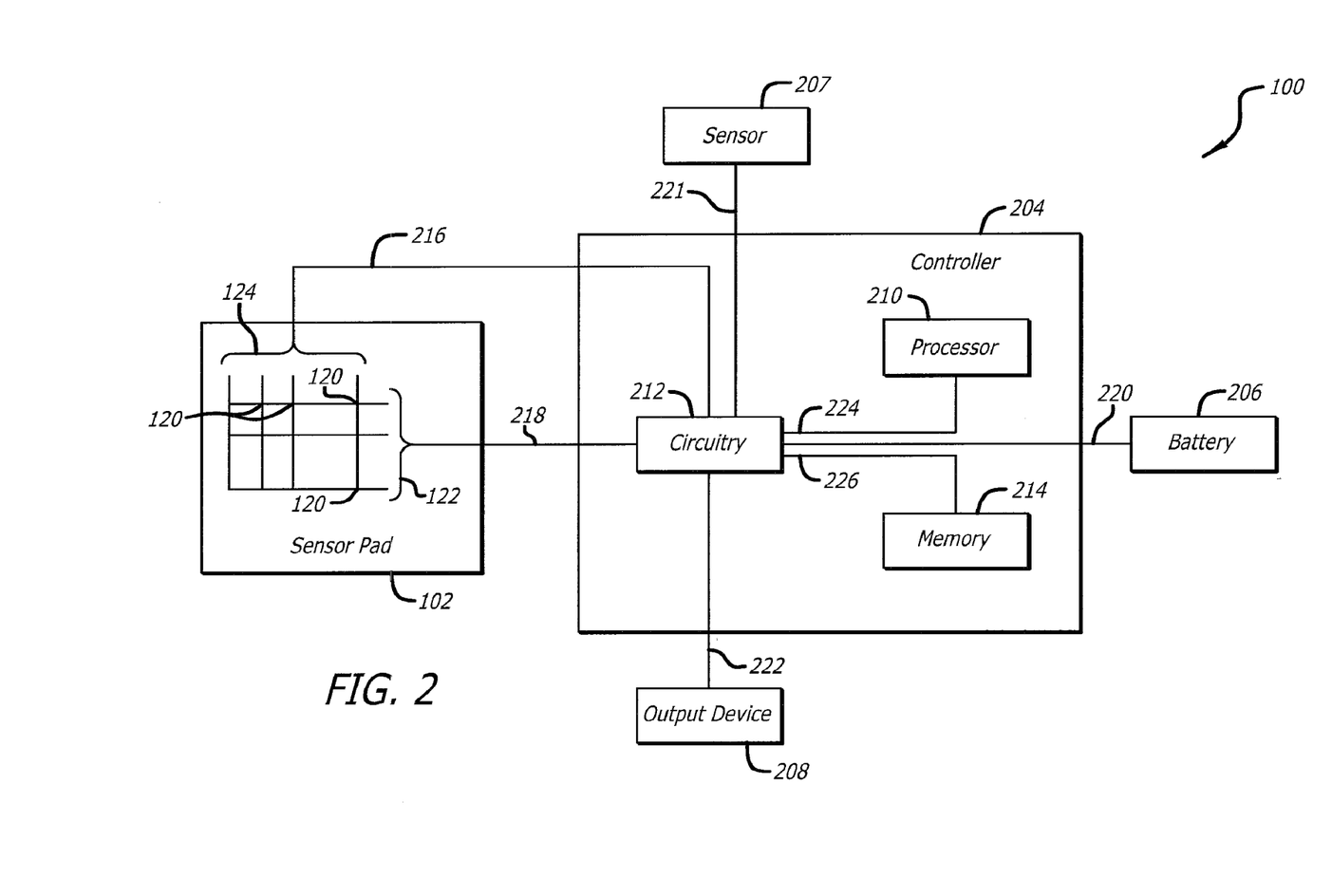
FIG. 2 is a block diagram of one example of an implementation of a training system.

As illustrated in FIGS. 1-6, a training system 100 is provided for aiding a horseback rider in maintaining balance while riding. In particular, the invention is directed to a self-contained training system that may be worn by a horseback rider to aid in the development of proper balance and stability. The training system 100 includes a sensor pad 102 in communication with a controller 204 (FIG. 2). The controller 204 may, for example, include a clip for securing the controller 204 to the rider's belt or slip into a pocket in the rider's breech.

The sensor pad 102 may be worn in the rider's breeches, for example. In general, the sensor pad 102 may be located anywhere between the saddle and the rider. For purposes of this application, a saddle may be a traditional saddle, a riding blanket or a bareback riding blanket. While the present invention is taught as a sensor pad 102 positioned between the rider and the saddle, those skilled in the art will recognize that the sensor pad 102 could be placed directly on the horse when riding bareback or could be integrated into a saddle or blanket and thus be positioned between the rider and the horse. It is not required that the sensor pad 102 be positioned between a rider and a saddle as described in the illustrated implementation.

In general, terms such as "coupled to," and "configured for coupling to," and "secured to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

FIG. 1 is a schematic of one example of an implementation of the construction of a sensor pad 102 that may be utilized in conjunction with the training system 100 of the present invention. FIG. 1 illustrates left 104 and right sides 106 of the sensor pad 102, along with the corresponding circuitry of the sensor pad 102. FIG. 1 also illustrates the layered construction of the sensor pad 102.

In particular, the sensor pad 102 includes a left pad or side 104 and a right pad or side 106. Each of the left and right pads 104, 106 include a plurality of sensors 120 formed by the intersection of vertical and horizontal opposing electronically conducting areas 122, 124 positioned on conductive fabric 110, 118.

As illustrated in FIG. 1, each sensing pad 104, 106 is comprised generally of five layers commencing with a first conductive fabric 110 having either horizontal or vertical electrically conducting stripes 122. The sensing pad 102 further includes a second conductive fabric 118 positioned opposite the first conductive fabric 110, having electrically conductive stripes 124 positioned perpendicular to the stripes 122 on the first conductive fabric 110. Positioned between the first and second resistive fabric (such as a Piezo-resistive fabric 22 k Ohms) 114 surrounded on both sides by layers of netting 112, 116.

The sensor pad 102 continually measures force exerted on the saddle by the rider at a plurality (e.g., dozens) of individual measuring points and sends the measured information to the controller 204. In some implementations, pressure exerted by the rider on the saddle may be collected and processed thousands of times per second.

The sensor pad 102 may be fabricated as an array of commercially available Force Sensing Resistors™ (FSR™). In some implementations, each Force Sensing Resistor™ may contain a portion of piezo-resistive material, which may, for in accordance with one example, be Velostat™ (e.g., $3/8$ in.×$3/8$ in. square, 8 mil thick), which is an anti-static packaging material, which may be impregnated with carbon black to make it conductive. In some implementations, the piezo-resistive material may be sandwiched between conductive film or fabric. Altogether these materials may form a variable resistor that responds as force is applied to it.

Additionally, the sensor pad 102 may be fabricated using layers of fabric with electrically conducting areas (i.e. stripes) isolated by non-electrically conducting areas. The electrically conducting areas of two conductive fabric layers 110, 118 are rotated such that the intersection of the areas form individual sensors 120. In between the layers of electrically-conducting fabric 110, 118 are layers of material such as fine netting 112, 116, used to create a physical space between the layers. In between the layers of netting 112, 116 is placed a layer of piezo-resistive fabric 114 to complete the force-sensing mechanism. Regardless of which method is used, the resulting force-sensing areas may be placed between a flexible carrier material. The material provides a water and dust resistant barrier for the electronics of the sensor pad and electrically isolates the low-voltage circuitry from contact with surrounding objects. The pad may be shaped to capture the force exerted between the rider and the saddle. The more force applied by the rider, the less resistance between the conductive layers.

To reduce the number of electrical connections within the sensor pad 102 and to the controller 204, a grid of vertical and horizontal circuits 122, 124 may be established. Under microprocessor control 210, a low DC voltage may be applied, in turn, to each vertical circuit 124 while the voltage is measured through each horizontal circuit 122 using a simple voltage divider circuit. In some implementations, a silicon-gate CMOS multiplexer and/or shift register may be used to manage the circuits and reduce the number of inputs to the microprocessor 210.

Those of skill in the art will recognize that the precise size, shape and placement of the sensors 120 in the sensor pad 102 is not critical to the present invention. In some implementations, the sensors 120 may be consistent and symmetrical across right and left sides of the sensor pad 102. In other implementations, the sensors 120 may be consistent and symmetrical across front and rear portions of the sensor pad 102.

Turning to FIG. 2, a block diagram of an example of an implementation of the training system 100 is shown. The training system 100 may include a sensor pad 102 and a controller 204. The controller 204 may be in signal communication with a power supply (such as, for example, a battery) 206, a sensor 207, and an output device 208.

The controller 204 may include a processor 210, control circuitry 212, and a memory 214. The control circuitry 212 may be in signal communication with the sensor pad 102, battery 206, sensor 207, output device 208, processor 210, and memory 214 via signal paths 216, 218, 220, 221, 222, 224, and 226, respectively.

The sensor pad 102 may include a plurality of force-sensing mechanisms or sensors 120 that include a plurality of vertical electrically conducting stripes 124 and plurality of horizontally electrically conducting stripes 122 creating a grid of vertical and horizontal circuits. The force-sensing mechanisms 120 being located at the intersection 232 of the plurality of vertical electrically conducting stripes 124 and plurality of horizontally electrically conducting stripes 122.

The plurality of vertical electrically conducting stripes 124 may be in signal communication with the control circuitry via signal path 216 and the plurality of horizontally electrically conducting stripes 122 may be in signal communication with the control circuitry via signal path 218.

The sensor 207 may be any sensor device that provides environmental or physically measured data to the controller 204. As an example, the sensor 207 may be an accelerometer or a wind measurement device. It should be noted, that FIG. 2 only shows one sensor 207 but that the present invention may utilize multiple sensors or may be utilized without any sensors 207. Although (not shown), the controller 204 may also include an input device that may allow various types of adjustments or selections, such as adjustments for rider experience, or selecting the type of output, to a name only a few examples.

The output device 208 may be any device capable of providing information from the controller 204. Examples of the output device 208 may include a vibrational motor, light source (such as an light emitting diode), sound transducer, a transmitter capable of transmitting information from the controller 204 to remote device. It should be noted, that FIG. 2 only shows one output device 208 but that the present invention may utilize multiple output devices.

The controller circuitry 212 may be any device, module, component, or combination of discrete components arranged in a way that allows the controller 204, in combination with the processor 210, to drive and receive data from the sensor pad 102, receive power from the power source 206, receive sensor data for the sensor 207, and produce output data that is sent to the output device 208. Based on design preferences of the controller 204, the control circuitry 212 may include a multiplexer circuit and/or shift register circuit that is in signal communication with the plurality of horizontally electrically conducting stripes 122 of the sensor pad 102. Additionally, the control circuitry 212 may also include circuitry capable of power the plurality of vertical electrically conducting stripes 124 with a low DC voltage. Moreover, the control circuitry 212 includes circuitry capable of measuring output voltages from the plurality of horizontally electrically conducting stripes 124. The controller circuitry 212 operates in combination with the processor 210 and may utilize the memory 214 for storage related to the operation of the processor 210 and storing of data produced by the sensor pad 102, sensor 207 or processor 210. The control circuitry may include a clock circuit, registers, analog-to-digital and digital-to-analog converters, bus circuitry, etc.

The processor 210 may be any processing module or component capable of reviewing data from the sensor pad and sensor and processing the data to produce new output data that may be sent to the output device 208 as feedback information. The processor 210 may be hardwired, programmable, or software based. Based on the design preference, the processor 210 may be a microprocessor, digital signal processor (DSP), application specific integrated circuit (ASIC), or other similar device.

As an example, the controller 204 may use an ATmega328™ microprocessor running at 8 MHz or 16 MHz under the Arduino™ platform; however, any number of combinations of hardware and/or software may be utilized within the scope of the invention.

The microprocessor 210 continuously polls each individual sensor 120 or sensing area in the sensor pad 102. The microprocessor 210 may calibrate each measurement based on an initial value, adjust each measured value for non-linearity of the circuit, the geography or relative position of the sensor and/or the significance of the measured value to the overall balance and stability of the rider, for example. Measurements may be aggregated based on measurements on the left and right sides 106, 104 of the sensor pad 102 over a preset time interval (such as two hundred milliseconds, for example) and the difference between the measurements may be calculated. This difference in the measurements may be computed as a percentage of the overall force exerted during the preset time interval. If this proportion exceeds a field adjustable amount, in some implementations the rider may be informed visually by a brief flash of bright multi-colored LED's and/or tactilely by a brief vibration from one of two vibrating motors placed at the rider's beltline, for example. An audible notification or combination of any of the above may further be utilized. If a reportable signal is not generated during a longer interval (e.g., a 30-second interval) both vibrating motors may operate simultaneously such that the rider may be made aware of the system's continuing functionality.

The output device 208 may be, among other things, a mechanism for alerting the rider when the rider is off-balance while riding. The alerting mechanism may be, for example, any type of device capable of notifying the wearer or a third party monitoring the wearer that the rider is off-balances, which may include alert devices that provide alone, or in combination with one another, tactile, audio or visual communications to the wearer.

The controller 204 may be housed in any suitable enclosure, such as a plastic enclosure configured for withstanding varying levels of force or impact. The controller 204 may include a power switch. In other implementations, the controller 204 may include a switch to prevent the vibrating motors from operating. In other implementations, the controller may be configured for attaching securely to the rider's beltline. Further, the controller 204 may communicate with the sensor pad 102 via a flexible cable or wireless signal, for example.

In one example of an implementation, the resulting feedback from the controller 204 may be regularly conveyed to the rider through a pair of small vibrating motors, for example. In this example, the vibrating motors may be attached to the rider (at his/her belt-line, for example) and may produce vibrating sensations on the rider when the controller 204 determines that the rider is off-balance based on the data measured by the sensors 120 in the sensor pad 102. For example, one vibrating motor may be placed on the right side of the rider, and one vibrating motor may be placed on the left side of the rider. As another example, the controller unit 204 may be configured for conveying feedback to the rider via audible sounds. In other implementations, the controller 204 may include one or more bright LED's (light emitting diodes) to provide a visual signal to a coach or instructor from across the arena. In yet other implementations, the controller 204 may transmit a signal to a coach or instructor displayed on a remote handheld receiver.

The controller 204 may be operated with a battery, a rechargeable lithium-ion battery, for example, which may last many hours depending on the duration and style of riding. The controller 204 memory may be data storage on an SSD card as one example, or may wireless transmit the data for offline analysis.

Figure 3:
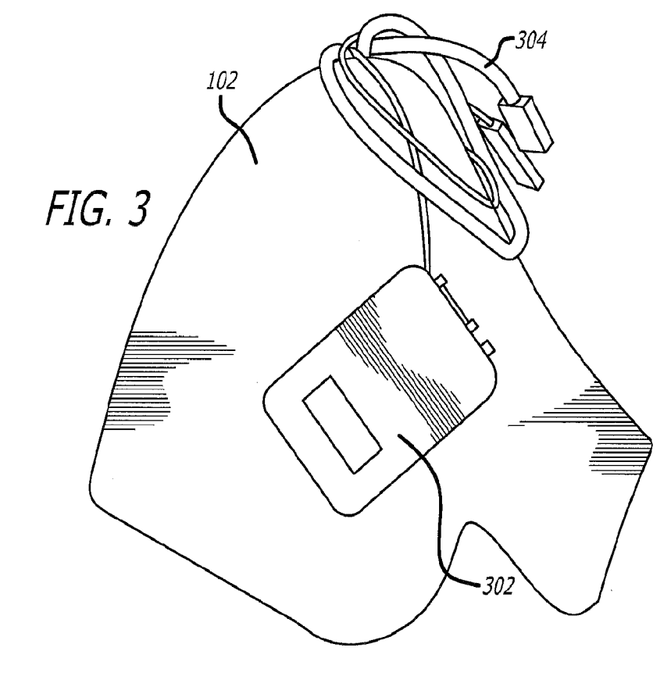
FIG. 3 is a perspective view of one example of an implementation of a training system showing a controller communicating with a sensor pad.

FIG. 3 is a perspective view of an example of a training system 100 according to the present invention, showing a controller 204 communicating with a sensor pad 102 via a 24-conductor flexible cable 304. The controller 204 includes a microprocessor 210 and supporting electronics (as illustrated in FIG. 2), as well as a rechargeable lithium-ion battery 206 as a power supply. As illustrated in FIG. 3A, the sensor pad 102 may be enclosed in a neoprene pouch 302.

While the illustrated embodiment shows the controller 204 connected to the sensor pad 102 those skilled in the art will recognize that the controller 204 may be separate from the sensor pad 102. The sensor pad may include components to control and power the circuitry within the pad 102 and may communicate the collected data to the controller via RF or WIFI or Bluetooth, to name a few examples.

It is further recognized that the controller 204 may include a display and may also collect data or other information regarding the rider and/or the environment to accommodate for environmental conditions, via sensor 207. For example, wind may be a factor in determining the amount of force an individual exerts upon the left side or right side of the horse at any given time. The wind conditions may be programmed into the controller and further the sensing pad may include directional information, such as a compass, to precisely calibrate the data as it is collected. The controller 204 may also provide for other types of adjustments to the sensing pad 102 and the processing of the data, such as the scale or expertise of the rider. The more skilled the rider, the less differential in the force distribution required to notify the rider he or she is off balance. Riders of less experience may allow for more tolerance in the variation of the force between the right and left sides of the sensor pad 102 before they are notified of the balance distribution being unequal.

The sensor pad 102 may be enclosed in a durable, water-resistant pouch (e.g., vinyl coated polyester or neoprene) which not only protects the sensor pad from friction, pounding, dust and moisture, but also makes the sensors 120 and circuitry barely noticeable to the rider and may provide a bit of cushioned comfort for the rider. In some implementations, the pouch may be sewn into the rider's breeches. The sensor pad 102 may be easily replaced by the user and may be removable such that the pouch that encloses the sensor pad 102 and breeches worn by the rider may be laundered, for example.

The sensitivity of the feedback may be adjusted up or down in the field to match the rider's skill level and personal preference. In implementations in which the rider wears two vibrating motors, periodic double vibrating sensations (e.g., left and right simultaneous vibrations) may alert the rider that the training system 100 is still operating even though the rider has been balanced for some time. In some implementations, the controller 204 may contain an accelerometer to detect the gait of the horse and rider. This information may be used to synchronize the feedback and signal the rider with a more natural rhythm. The accelerometer may also be used to detect whether the rider is mounted or not and suspend operation at times when the rider is not actively riding.

Figure 4A:
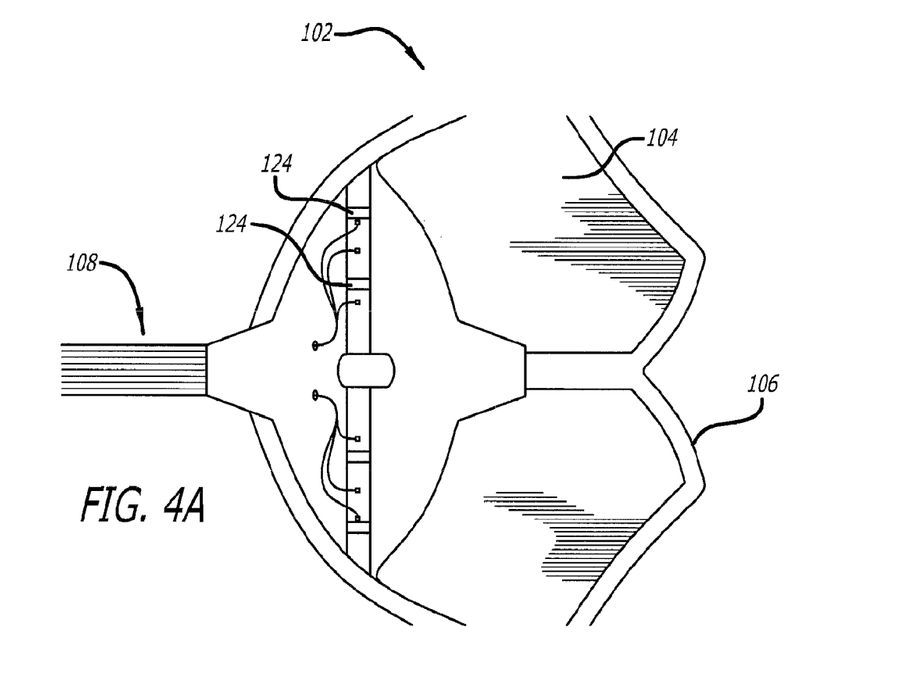
FIG. 4A is a bottom view of one example of a pouch for containing the sensor pad (partially disassembled) illustrated in FIG. 3.

FIG. 4A is a perspective view of the pouch containing the sensor pad 102 (partially disassembled) illustrated in FIG. 3. This pouch may be sewn into the seat of rider's pants, for example. As illustrated in FIG. 4A, the sensing pad 102 includes a right sensor 106 and left sensor 104. FIG. 4A illustrates the back of the conductive layers of each pad 106 and 104 having vertical sensing stripes 124 connected by wires 108 in communication with the controller 204 (FIG. 2).

Figure 4B:
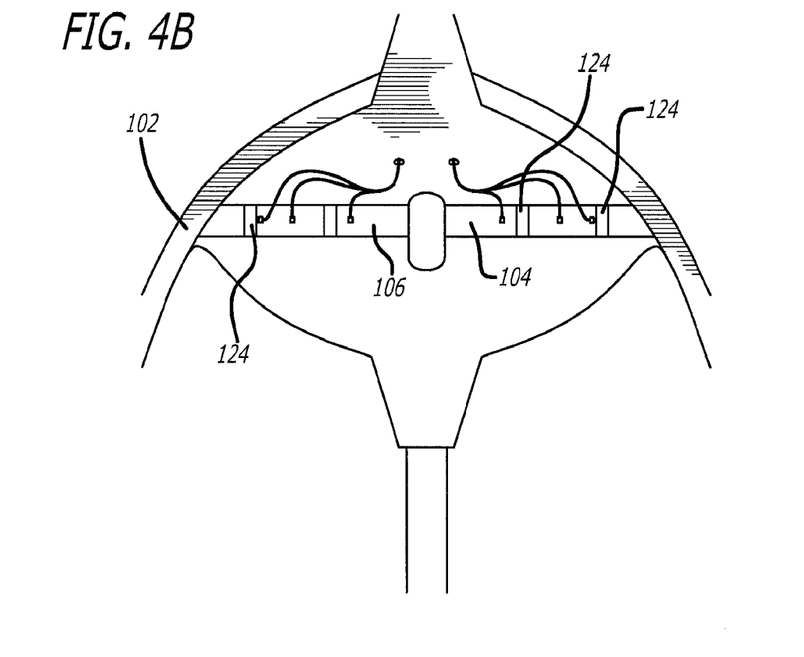
FIG. 4B is a close up of one example of an implementation of the bottom interior of a sensor pad.

FIG. 4B is a close up of an example of the bottom interior of a sensor pad 102 according to the present invention, where each stripe represents the vertical conductive areas 124 of the sensor pad 102. In this example, wires 108 are attached by conductive epoxy adhesive. However, either electrically-conducting copper rivets or adhesive such as conductive epoxy may be used to attach wires and complete the circuit to the fabric. Other known methods of attaching the wires such that they are conductive may also be utilized.

Figure 5A:
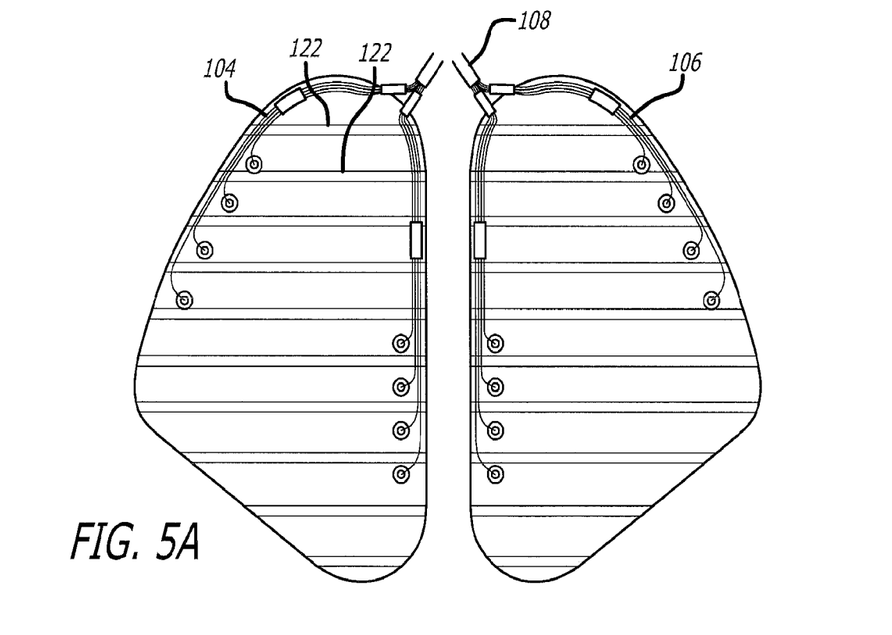
FIG. 5A is a top view of one example of an implementation of a sensor pad.

FIG. 5A is a top view interior of a sensor pad according to the present invention, where each stripe represents the horizontal conductive areas 122 of the sensor pad 102. In this example, wires 108 are attached to the left and right sensory pads 106, 104 by copper rivets.

Figure 5B:
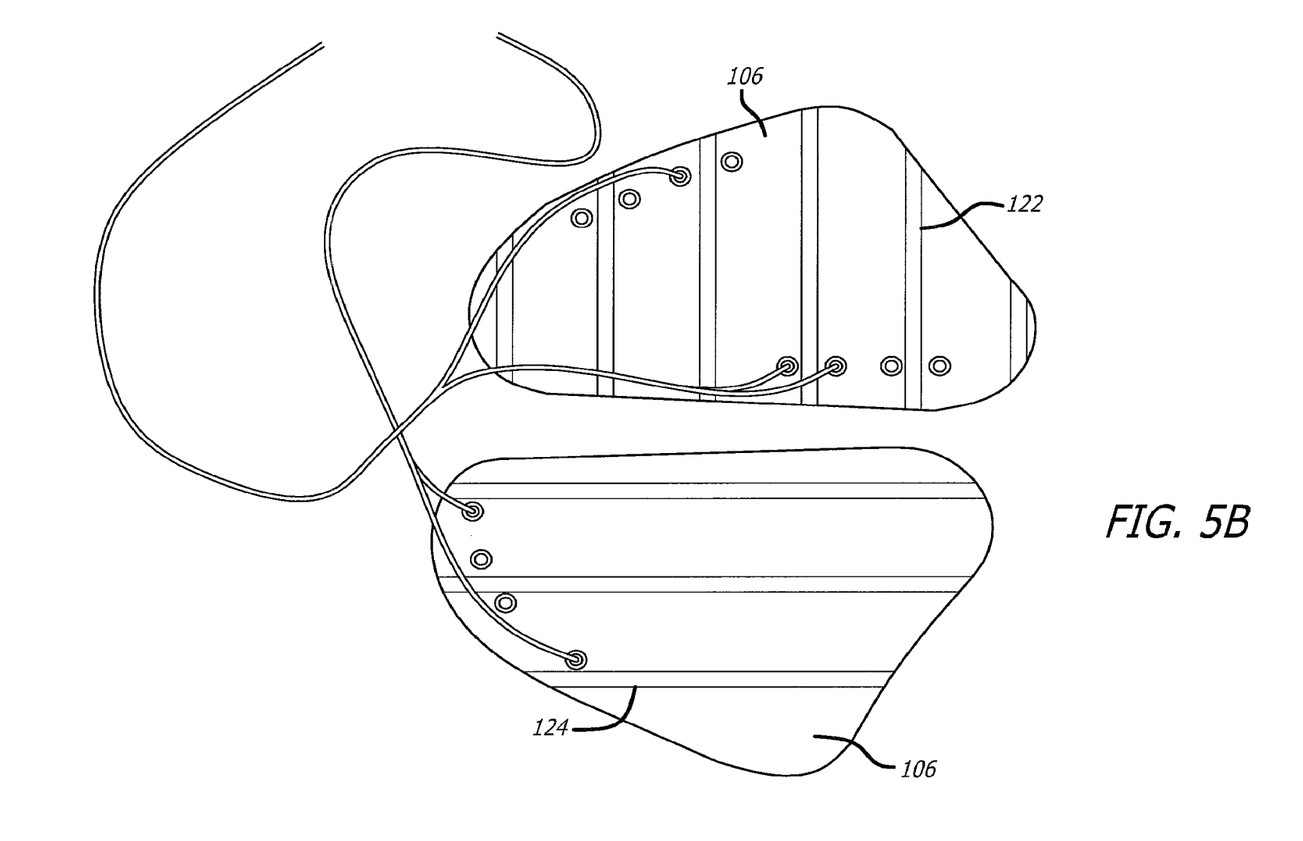
FIG. 5B is a plan view of one example of an implementation of the top and bottom interior conductive areas of the sensor pad.

FIG. 5B is a plan view of an example of the top and bottom interior conductive areas of the sensor pad 102 according to the present invention. When the two halves are mated together, the intersection of the vertical and horizontal stripes 122, 124 form individual sensors.

As illustrated in FIG. 5B, both the upper and lower sides of the right sensing pad 106 are illustrated side by side to show the electric conductive strips being positioned perpendicular to one another on the top and bottom conductive layers 110, 118 that form the sensing pad 102. The top layer 110 illustrates the horizontal electronic conducting strips 122 and the bottom conductive layer 118 illustrates the vertical electronically conducting stripes 124.

Figure 6:
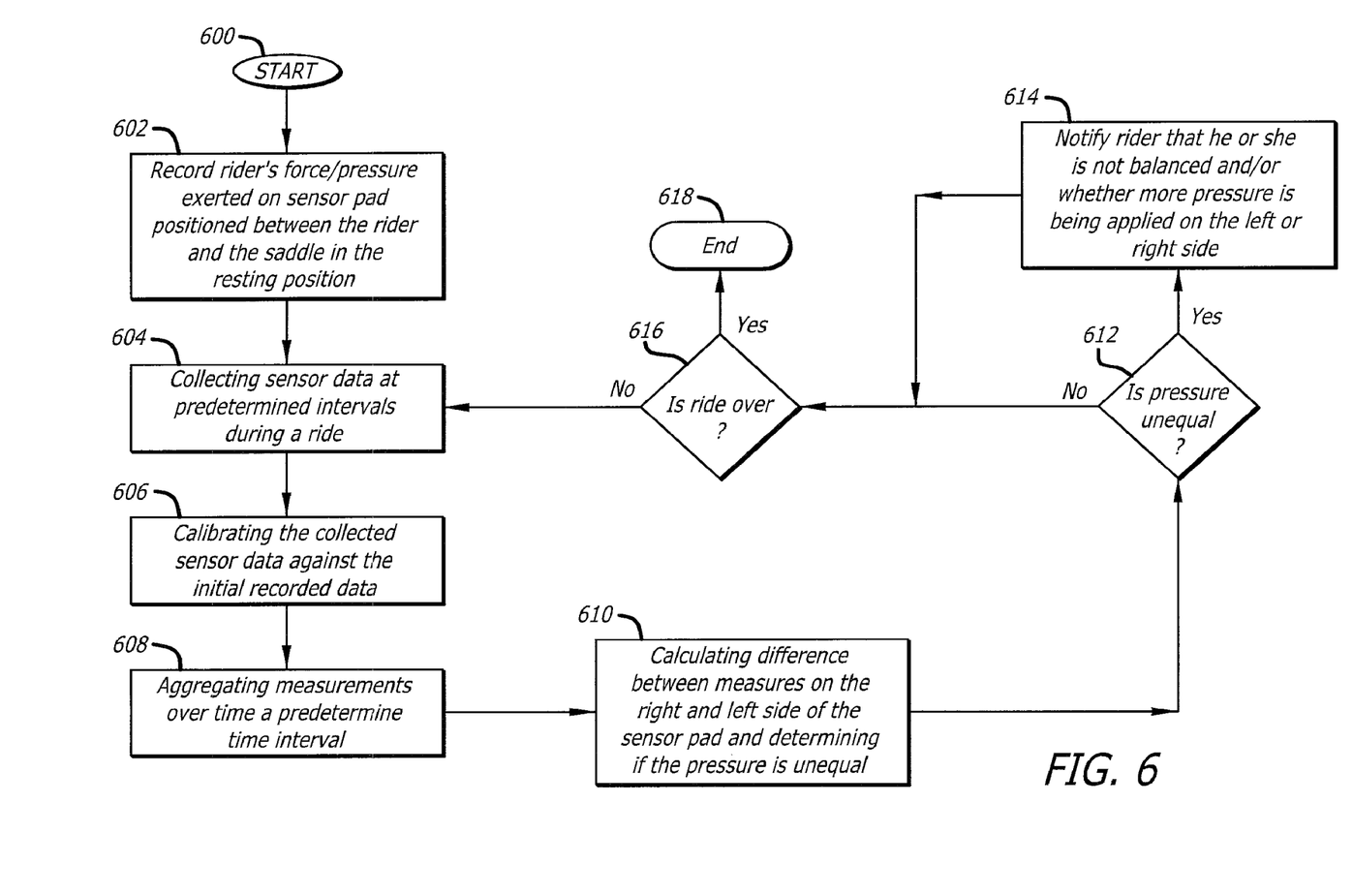
FIG. 6 illustrates one example of a flow diagram describing a method of operation of the training system 100 illustrated in FIG. 2.

FIG. 6 illustrates on example of a flow diagram describing a method of operation of the training system 100 illustrated in FIG. 2. The method illustrated in FIG. 6 first starts at 600. In step 602, the system first records the riders force or pressure exerted on a sensor pad 102 positioned between the rider and the saddle in the rest position. At step 604, the system then collects sensor data at predetermined intervals during the ride. At step 606, the system, in particular the control 204 calibrates the collected sensor data against the initial recorded data. At step 608, the system and in particular the controller 204, aggregates the measurements over time at predetermined time intervals. The system then calculates the difference between measurements on the right and left side of the sensor pad and determines if the pressure between the right and left side of the sensor pad is unequal. At step 612, if the pressure is unequal, the rider is notified, at step 614, that he or she is not balanced and/or whether more pressure is being applied on the left or right side. If the pressure is equal, and the ride is still continuing (step 616), the system continues to collect sensor data at predetermined intervals during the ride. If the pressure is equal and the ride is over (step 616), the process is then terminated at step 618.

In operation, a pair of breeches or shorts (which may be made of Lycra, or Spandex for example) may be worn by the rider. The garment may contain a pouch or sleeves into which the sensor pad may be inserted. For example, the pouch may be heavy-duty lycra or 0.5 mm neoprene sewn into the rear of the garment. The pouch helps keep the sensor pad flat and in the proper position; and may provide some cushioning to the rider. Velcro, snaps, buttons or other fasteners may be used to hold the sensor pad in position within the breeches or shorts.

It will be understood, and is appreciated by persons skilled in the art, that one or more processes, sub-processes, or process steps described in connection with FIGS. 1-9 may be performed by hardware and/or software. If the process is performed by software, the software may reside in software memory (not shown) in a suitable electronic processing component or system such as, one or more of the functional components or modules schematically depicted in FIGS. 1-9. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A sensor pad for aiding a horseback rider in maintaining balance while riding a horse, the sensor pad comprising:
   a two conductive fabric layers having at least one resistive fabric layer there between; and
   a plurality of sensors created by the opposing conductive fabric layers, said plurality of sensor distributed across the sensor pad, where the sensors are force-sensing sensors for detecting the force of the rider while riding the horse.

2. The sensor pad of claim 1 where the sensor pad further includes a resistive fabric layer surrounding by netting on each side positioned between the two conductive fabric layers.

3. The sensor pad of claim 1 where the two conductive fabric layers are positioned within a pouch.

4. The sensor pad of claim 1 where the first conductive fabric includes horizontally electrically conductive stripes.

5. The sensor pad of claim 4 where the second conductive fabric includes vertically electrically conductive stripes.

6. The sensor pad of claim 5 where the intersection of the horizontally electrically conductive stripes and the vertically electrically conductive stripes create the plurality of sensors.

7. A system for aiding a horseback rider in maintaining balance while riding, comprising:
   a sensor pad configured for positioning between a rider and a saddle, the sensor pad including sensors for measuring force exerted by the rider on the saddle at a plurality of individual measuring points;
   a controller in communication with the sensor pad, the controller being configured for receiving force data from the sensor pad, where the controller comprises:
      a microprocessor configured for continuously polling each sensor in the sensor pad for force data, calibrating each measurement based on an initial value, adjusting measurements based on environmental factors, aggregating measurements from sensors on a left side and a right side of the sensor pad over a predetermined time interval, and calculating the differences between measurements on the right side and left side of the sensor pad;
      a power supply; and
      appropriate electronic circuitry; and
   at least one alerting mechanism in communication with the controller, the alerting mechanism being configured to receive a signal from the controller and notify the rider when the rider is off-balance based on the calculated differences between measurements on the right side and left side of the sensor pad.

8. The system of claim 7 where the alerting mechanism is a vibrating mechanism.

9. The system of claim 7 where the alerting mechanism is a light.

10. The system of claim 7 where the alerting mechanism is audible.

11. A method for aiding a horseback rider in maintaining the balance while riding, the method comprising;
   determining the initial force values exerted by a rider on a horse in a resting position using a plurality of sensors positioned underneath the rider;
   continually measuring and sensing the force applied by the rider underneath the rider against the sensors periodically throughout the course of a ride;
   calibrating the values sensed while riding against the initial force values over a predetermined time period;
   comparing the values measured on the rights side of determining whether a rider is balanced on the horse by determining if more force is being exerted on one side over the other based upon the compared values;
   notifying the rider when the system detects that more pressure is being exerted on either the left or right side by the rider based upon the compared values.

* * * * *